Dec. 25, 1956 L. PRICE 2,775,039
GUILLOTINE GAUGE
Filed May 20, 1955 2 Sheets-Sheet 1

INVENTOR.
LEO PRICE

Dec. 25, 1956     L. PRICE     2,775,039
GUILLOTINE GAUGE

Filed May 20, 1955     2 Sheets-Sheet 2

*INVENTOR.*
LEO PRICE

United States Patent Office 2,775,039
Patented Dec. 25, 1956

2,775,039

GUILLOTINE GAUGE

Leo Price, Cleveland Heights, Ohio

Application May 20, 1955, Serial No. 509,725

7 Claims. (Cl. 33—174)

My invention relates to gauging devices and more particularly to gauging devices utilizing guillotine gauge blades.

An object of my invention is the provision of an improved construction of a mounting for gauge blades adapted for flexibility in gauging of different articles.

Another object is the provision of a mounting for guillotine gauge blades so constructed as to permit different arrangements and disposition of the gauge blades with the use of one base member as a foundation.

Another object is the provisions of a base member so constructed and arranged that guillotine gauge blades may be mounted thereon in a plurality of of positions and arrangements as required for different articles.

Another object is the provision of standard parts for a gauge mounting so constructed as to provide for flexibility in arranging a plurality of gauging positions for guillotine gauge blades.

Another object is the provision for economy and efficiency in the construction of mounting means for guillotine gauge blades.

Another object is the provision for obtaining results not heretofore known and in a manner not heretofore obtainable.

Another object is the provision for an improved construction in the mounting of guillotine gauge blades.

Still another object is the provision for selectability and variation in the assembly of a mounting for guillotine gauge blades.

Other objects and a fuller understanding of my invention may be had by referring to the following description and claims, taken in conjunction with the accompanying drawings, in which:

Figure 1:
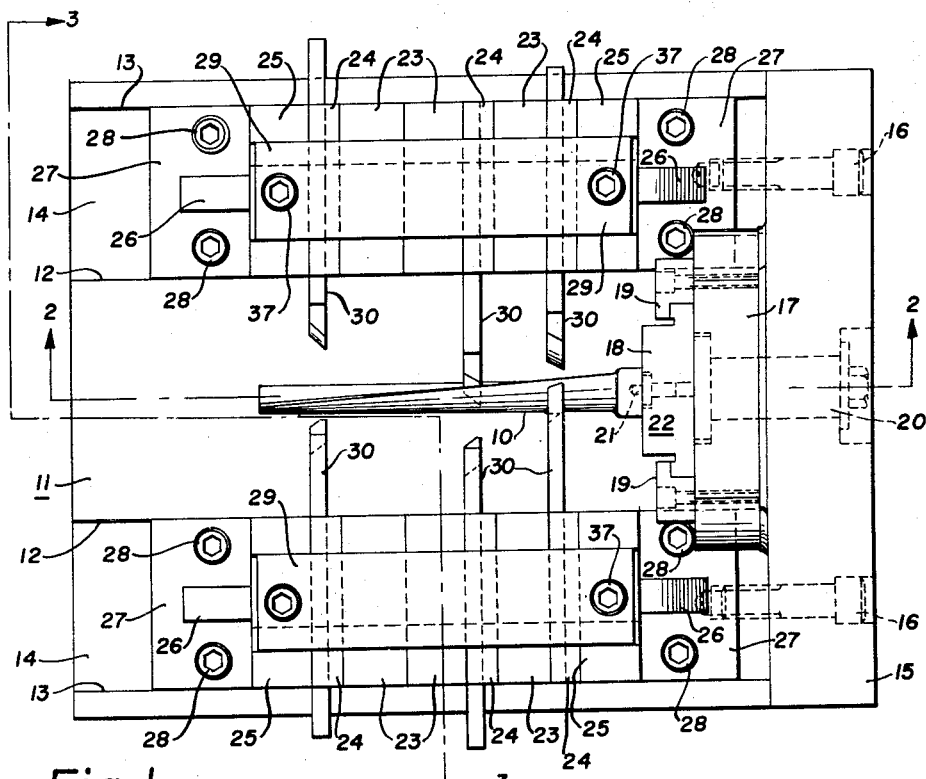
Figure 1 is a plan view of a gauging device embodying my invention.
Figure 2:
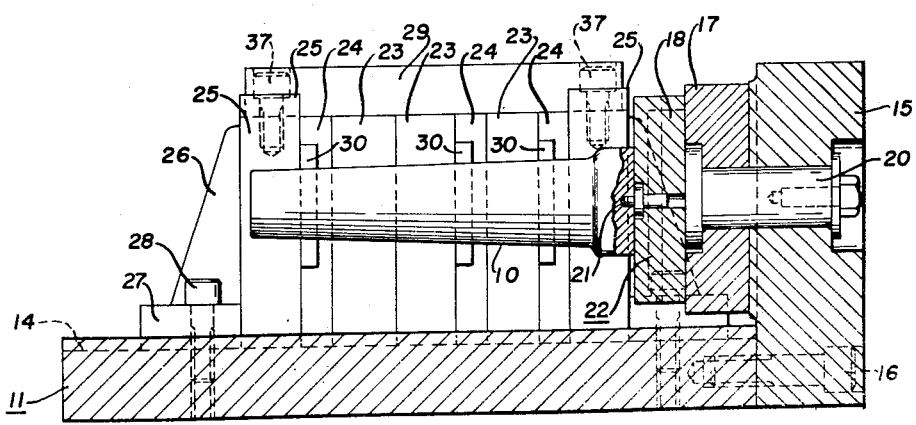
Figure 2 is a side view of the device shown in Figure 1, partly in section and partly in elevation, and taken along the line 2—2 of Figure 1.
Figure 3:
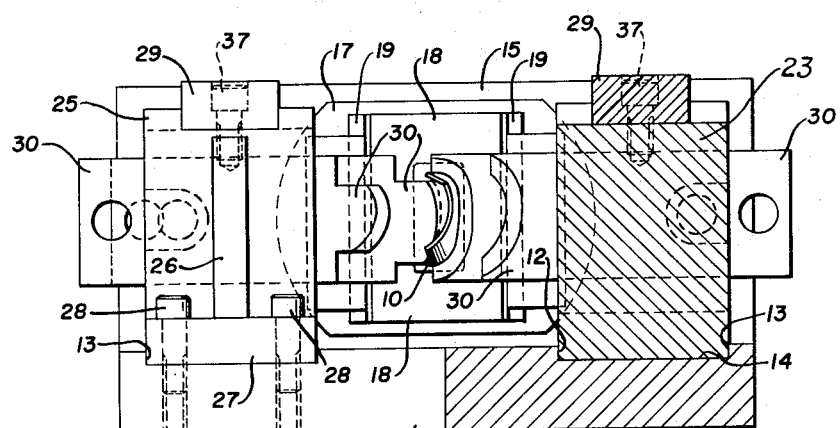
Figure 3 is an end view, partly in section, taken through the line 3—3 of Figure 1.

Guillotine gauge blades are utilized for gauging the dimension and contour of many types of articles. One of the typical articles gauged with guillotine gauge blades is the bucket or blade of a turbine engine. I have illustrated my device with such an article to be gauged. Differently shaped and sized articles require different gauge blades and also different positioning of the gauge blades. For example, a relatively long article will require one spacing of gauge blades, whereas a shorter article will require another spacing of gauge blades. The requirements for gauges of this type have usually required the building of entirely different mountings for the gauge blades. This has been uneconomical and burdensome for the construction of a considerable number of mountings for gauge blades. It has also required the complete disassembly and rebuilding of the entire mounting when the devices are to be repaired and reset. The difficulties and expense encountered in both the original construction of the mountings for guillotine gauge blades and for the repair and reconstruction of the mountings is well known to those acquainted with the use of such devices.

It will be apparent from a consideration of my device as herein described and disclosed that with standard parts and with a minimum of changes, great flexibility is obtained in constructing different gauge blade mountings for gauging different articles. It will also be appreciated that the repair and reconstruction of the mountings will require a minimum of parts and work, rather than the complete reworking of many parts as required under former practice.

In the embodiment of my device disclosed in the drawings, the reference character 11 denotes generally the base member used for the mounting. The base member 11 is disposed generally in a horizontal plane and preferably comprises a plate or flat body of steel or other suitable material. Extending along opposite sides of the base member 11 are two grooves or channels parallel to each other and to the longitudinal sides of the base member. Each channel has a bottom wall 14 lower than the central or intermediate portion of the base member. Extending along the sides of each channel is an inner wall 12 and an outer wall 13, these walls being parallel to each other and to the walls of the other groove. The walls which define the central or intermediate portion are referred to as the inner walls and the walls most distant from the central portion of the base member are referred to as the outer walls.

Bolted to one end of the base member 11 is a supporting plate 15 secured thereto by bolts 16. An orienting device denoted generally by the reference character 22 is carried by the support 15. The purpose of the orienting device 22 is to orient or hold in proper position an article to be gauged, such as the turbine blade or bucket 10. The orienting device is arranged to hold the article or blade 10 in a generally horizontal position above the plane of the base member 11 so as to orient the article in relationship to a primary reference line disposed in a horizontal plane parallel to the base member 11 and above the central portion intermediate the channels in the base member.

The orienting device 22 has a rotatable part 17 held by a shaft 20. Secured to the rotatable part 17 is a transversely sliding part 18 secured thereto by slide guides 19. Carried centrally on the transverse slide part 18 is a tongue or pin 21 adapted to interfit and engage a complementarily shaped end of the article 10 being gauged. By appropriate rotation of the rotatable part 17 and transverse movement of the part 18, the article 10 to be gauged is properly oriented in respect to the primary reference line of the gauging device.

Arranged in two parallel rows are a plurality of spacer blocks 23 and a plurality of guide blocks 24. The spacer blocks and guide blocks are intermingled or selectively alternated so as to arrange for the desired spacing between and positioning of the guide blocks on the base member. The guide blocks each have a channel 34 formed therein which accommodates a guillotine gauge blade 30 in a close sliding fit so as to permit the gauge blades 30 to move across the guide block 24 in its channel 34. A spacer block 23 overlays the channel 34 of the guide block 24 so that the gauge blade moves between the adjoining guide block and spacer block.

In the embodiment shown, there are six guillotine gauge blades 30. The several guillotine gauge blades are slidably mounted at predetermined positions along the length of the base member, depending upon the size and shape of the article to be gauged. The gauge blades 30 are arranged in pairs, each pair having a male and a female shaped end complementing the contour of the article being gauged. The guillotine gauge blade of each pair are in alignment and are directed in opposition to each other so that their contoured ends are directed toward the article 10. To provide for positioning the gauge blades at the proper position along the length of the base member with respect to a particular article to be gauged, the spacer blocks and guide blocks are provided and appropriately arranged.

Figure 4:
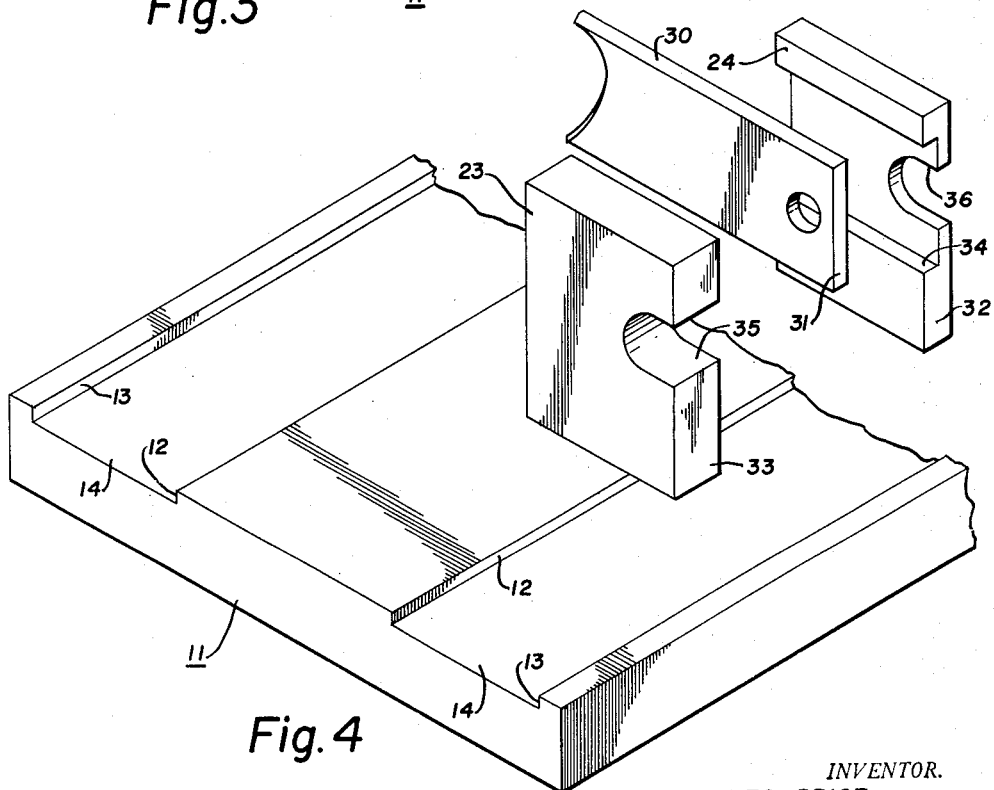
Figure 4 is an enlarged perspective view of a portion of the base member used in my mounting and showing in an exploded or expanded arrangement a spacer block, guide block and guillotine gauge blade adapted to be mounted to the base member.

The detailed construction of a spacer block 23, a guide block 24 and a guillotine gauge blade is illustrated in Figure 4. Half of the guide blocks and spacer blocks are arranged in rows along one groove and the other half of the spacer blocks and guide blocks are arranged in a row along the other groove of the base member. The number of guide blocks 24 to be used depends upon the number of pairs of gauge blades to be utilized. The number and size of the spacer blocks 23 to be utilized depends upon the desired position of the respective pairs of opposed gauge blades along the length of the article to be gauged. Appropriate spacing of the guide blocks is obtained by selectively intermingling or alternating the required number of spacer blocks with the guide blocks so that the required space between guide blocks is provided by the spacer blocks. Preferably, the thickness of the guide blocks is a modulus of the thickness of the spacer blocks.

For example, the spacer block 23 shown in the drawings is three times the thickness of the guide block 24. Other proportions of thickness may be utilized. Also, of course, spacer blocks of any desired thickness may be utilized in order to meet the requirements of the particular mounting to be assembled. To arrive at the proper spacing, one spacer block of a certain thickness may be utilized or a number of spacer blocks, which together have thicknesses which combine to form the required spacing, may be utilized. If desired, to accommodate other gauge blades or to accommodate other arrangements, other thicknesses of guide blocks and other numbers of guide blocks may be utilized.

Each of the guide blocks and spacer blocks have opposed surfaces which engage the shoulders provided by the opposed walls 12 and 13 of a groove. In other words, each guide block and spacer block is dimensioned so as to closely fit within a groove of the base member so that the blocks rest upon the bottom wall 14 of the groove and the opposed outer surfaces of the blocks closely interfit with the opposed shoulders or walls 12 and 13. The blocks 23 and 24 are set on edge and are partially within the grooves and held in straight rows parallel to each other by their interengagement with the walls or shoulders 12 and 13.

At the opposite ends of each of the two rows of blocks 23 and 24 are abutting members secured to the base member to prevent the blocks from moving longitudinally of the base member parallel to the walls 12 and 13 of the grooves. Each abutting member is made up of an end block 25 which fits within a groove intermediate the walls 12 and 13 and is similar in thickness to a spacer block 23. Secured to the end blocks 25 are buttress braces 26 which, in turn, are secured to buttress bases 27. The parts 25, 26 and 27 are joined together and form abutting members which are positioned at the opposite ends of each of the rows of blocks 23 and 24. Bolts 28 secure the base of the abutting member to the base member 11 and thus the blocks 23 and 24 are held clamped together in the respective grooves and are held against displacement longitudinally of the base member.

Extending over each row of blocks 23 and 24 is a bar 29 which is secured to the tops of the end blocks 25 of the abutting members by means of bolts 37. The bars 29 extend over the tops of the blocks 23 and 24 and hold them down firmly within the respective grooves. By this arrangement, the rows of blocks 23 and 24 alternated and arranged as desired are firmly held in position upon the base member. When it is desired to make other arrangements and to add or subtract spacer blocks and guide blocks, the bars 29 may be removed and the abutting members moved to required positions for accommodating a new arrangement of blocks. Thereafter, the abutting members at the ends of the rows are again bolted to the base member and bars 29 of suitable length are again bolted to the opposite end blocks 25 of the respective abutting members.

At the end of each guillotine gauge blade is a reference surface 31. Also at the end of the guide blocks 24, is a reference surface 32 and at the corresponding end of the spacer blocks 23 is a reference surface 33. With the blocks arranged in rows and held in proper place by the walls of the grooves, the reference surfaces 32 and 33 of each row of blocks 23 and 24 are arranged in a straight plane. The reference surfaces 32 and 33 making up each plane provide a reference for comparison with the position of the reference surface 31 provided on the end of each guillotine gauge blade 30. By comparing the position of the reference surface 31 with the aligned surfaces 32 and 33 of the adjoining blocks, the relative position of a guillotine gauge blade 30 may be determined. By moving the guillotine gauge blade 30 inward against the article 10 being gauged, the contour and dimension of the article 10 may be determined by this comparison between the position of the reference surface 31 of the gauge blades with the adjoining reference surfaces 32 and 33 of the aligned blocks of each row.

To provide ready finger access to the gauge blades, that is, to permit the gauge blades to be readily seized by the fingers, cutaway portions 35 and 36 are provided in the spacer blocks 23 and guide blocks 24, respectively. These cutaway portions 35 and 36 are in alignment and thus provide access for taking hold of the gauge blades 30.

Inasmuch as the grooves are of equal size, that is, the walls 12 and 13 of each groove are spaced apart the same amount, and inasmuch as the blocks 23 and 24 of each row of blocks have the same dimensions, the planes of the reference surfaces 32 and 33 of each row of blocks are spaced equidistantly from the primary reference line along which the article 10 extends. This primary reference line is disposed in a vertical plane extending through the base member 11 equidistantly between the two inner walls 12 of the respective grooves. This primary reference line is also elevated from the top horizontal plane of the base member. Thus, the side walls of the parallel grooves provide secondary reference lines uniformly spaced from the primary reference line and as these secondary reference lines determine the spacing of the blocks 23 and 24 from the primary reference line, it is provided that with my assembly of parts the reference surfaces of the two rows of blocks 23 and 24 are always properly positioned relative to the primary reference line to which the gauging of the article is related.

By the arrangement described, it will be appreciated that different articles will be accommodated and that a mounting is provided for the guillotine gauge blades with a minimum of changes or substitutions. Inasmuch as all of the parts of the base member are related to the primary reference line and inasmuch as the size of the several blocks is related to the base member and the walls of the grooves thereof, a true and accurate mounting is provided for the guillotine gauge blades in a variety of arrangements utilizing the several parts as herein described.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A gauging device comprising in combination a base member, said base member having a reference point intermediate of opposite sides thereof, aligning means mounted to said base member and positioned relative to said reference point for aligning an article to be gauged, said base member having adjacent each of said opposite sides a pair of opposed straight shoulders parallel to each other and to the shoulders of the other pair of shoulders, a line passing thorugh said reference point parallel to said shoulders being equidistant from the inner shoulders of said pairs of shoulders and equidistant from the outer shoulders of said pairs of shoulders, a plurality of guide blocks, a plurality of spacer blocks, a first group of said guide blocks and spacer blocks being alternately arranged in a line over said base member between the shoulders of one said pair of shoulders and a second group of said guide blocks and spacer blocks being alternately arranged in a line over said base member between the shoulders of the other said pair of shoulders, the blocks of each group of alternately arranged guide blocks and spacer blocks having oppositely disposed and spaced surfaces extending therealong, the spaced surfaces of said alternately arranged blocks engaging the opposed shoulders of said pairs of shoulders, respectively, to retain the position of said blocks relative to said line passing through said reference point, and abutting means secured to said base member and abutting the opposite ends of the respective groups of alternately arranged guide blocks and spacer blocks to restrain said blocks against movement along said base member parallel to said shoulders, each of said guide blocks having a channel formed in a face thereof and disposed transversely of the guide block, each said channel being adapted to slidably receive and guide a guillotine gauge blade movable through the channel, each said guide block having a side forming a reference plane at the end of said channel for comparing a position of a said blade in the channel with the said side, said sides of the guide blocks of each group being in a common plane parallel to the common plane of the other group, the guide blocks and spacer blocks of each group having aligned open spaces adjacent said common plane to provide finger access to blades in said channels.

2. A gauging device comprising the combination of a base member having a central portion and grooved portions on opposite sides of said central portion, an orienting device secured to said base member, said orienting device being adapted to orient an article to be gauged relative to a reference line passing across said central portion, a first group and a second group of alternately arranged guide blocks and spacer blocks, each of said groups being aligned in a row and positioned over one of said grooved portions of the base member, each group of blocks having a pair of parallel opposed surfaces and each grooved portion having a pair of parallel opposed shoulders adapted to engage the parallel opposed surfaces, respectfully, of said blocks to retain the blocks in position relative to said reference line, said reference line being disposed parallel to and equidistantly from the inner shoulders of said opposed shoulders and the outer shoulders of said opposed shoulders, and abutting means secured to said base member and abutting the blades at opposite ends of each row of blocks to restrain movement of said blocks along said shoulders, said guide blocks being adaped to slidably receive and guide guillotine gauge blades movable relative to said reference line to engage said article being gauged, the position of said guide blocks being determined by said base member and spacer blocks, the said guide blocks having their sides directed away from said reference line disposed in vertical planes parallel to each other and to said reference line, said vertical planes providing reference for comparison with the positions of said blades.

3. The combination of a base member, an orienting device mounted to the base member for orienting an article to be gauged relative to a reference line passing horizontally over the base member at a location intermediate of its sides, support means carried by said base member adjacent its opposite sides and embracing said reference line, each said support means comprising a plurality of guide blocks and spacer blocks alternately arranged and disposed in horizontal rows over said base member adjacent said sides, each row of blocks and said base member having interengaging faces extending upwardly from a horizontal plane passing through said base member, the interengaging faces of said base member and said rows of blocks being disposed on opposite sides of said locations and parallel to said reference line and retaining the positions of said blocks relative to said reference line, and means secured to said base member for restraining movement of said blocks along said base member parallel to said reference line, each said guide block having a horizontally disposed slideway formed therein for slidably receiving a guillotine gauge blade movable therein relative to said reference line, each guide block having a side thereof providing a reference plane for comparing the position of the blade carried by the guide block with said reference plane, said sides forming said reference planes of said support means being disposed parallel to said reference line.

4. The combination of a base member, an orienting device mounted to the base member adjacent an end thereof for orienting an article to be gauged relative to a reference line passing over said base member and parallel thereto, support means carried by the base member adjacent opposite sides thereof and embracing said reference line, each said support means comprising a plurality of guide blocks and spacer blocks alternately arranged in horizontal rows over said base member adjacent a said side, the base member having parallel grooves formed therein adjacent said sides, respectively, and accommodating said rows of blocks, respectively, between the opposite walls of the grooves, said walls being parallel to each other and to said reference line and maintaining said blocks in alignment and maintaining said rows parallel to each other and to said reference line, each said guide block having a slideway formed therein for slidably receiving a guillotine gauge blade movable therein relative to said reference line, each guide block having a side thereof providing a reference plane for comparing the position of the blade carried by the guide block with said reference plane, said sides forming said reference planes being at distances from said reference line predetermined by said grooves.

5. A mounting for guillotine gauge blades movable toward and away from an article to be gauged and on opposite sides thereof, comprising a base member, said base member having a central portion and two side portions on opposite sides of said central portion, said base member having in alignment with said central portion an end portion adapted for securing an article-orienting member to said base member in position relative to a primary reference line extending in a horizontal plane over said central portion, said base member having grooves extending along said side portions, said grooves having walls parallel to each other and to said primary reference line, said walls of each groove being disposed along secondary reference lines on opposite sides of said reference line, a plurality of guide blocks for slidably receiving and guiding said gauge blades, a plurality of spacer blocks for fixing the relative spacing of said guide blocks, said guide blocks and spacer blocks having oppositely disposed faces corresponding in spacing with the spacing between the walls of the respective grooves, said guide blocks and spacer blocks being grouped in two parallel and spaced rows, said guide blocks and spacer blocks being intermingled in each of said rows, a group of blocks being positioned along each side portion of the base member to interengage the oppositely disposed faces of the blocks and the walls of the grooves, said walls retaining the rows of blocks in alignment and in spaced relationship to said reference line, each of said guide blocks having a side forming a reference plane for comparison with the position of the gauge blade guided by the guide block, said reference planes having a fixed spacing from secondary reference lines, the arrangement of base member, guide blocks, and spacer blocks being such that said sides of the guide blocks are positioned in said reference planes relative to, and on opposite sides of, said primary reference line.

6. The combination of a base member, guide blocks and spacer blocks for mounting a plurality of guillotine gauge blades reciprocal in said guide blocks relative to an article to be gauged, said base member having a primary reference line horizontally disposed above, and parallel to, the horizontal plane of said base member, means for securing an article orienting mechanism to said base member to orient an article relative to said primary reference line, said base member having horizontally extending channels on opposite sides of, and disposed on secondary reference lines equidistantly from, said primary reference line, said channels having opposite walls aligned parallel to each other and to said primary reference line, said guide blocks and spacer blocks being intermingled and arranged in rows along the respective channels and in interengagement with said opposite walls to retain their spatial relationship to said primary reference line, and means for securing said blocks against movement along said base member parallel to said walls, some of said blocks having reference surfaces for determining the position of said blades relative to said primary reference line.

7. The combination of a base member, said base member having a pair of straight grooves formed therein, said grooves being parallel to each other and spaced equidistantly from and arranged on opposite sides of a vertical plane passing through the base member and a reference line extending horizontally above said base member, a plurality of blocks adapted to slidably guide and to space a plurality of guillotine gauge blades in paths parallel to each other and toward and away from said reference line, said blocks being arranged in a pair of rows, each row being disposed in a said groove and held in fixed spatial relationship to said reference line by the walls of a respective groove, and abutting members secured to said base member at the opposite ends of said rows to restrain said rows against movement along said grooves.

References Cited in the file of this patent

UNITED STATES PATENTS

| | | |
|---|---|---|
| 1,364,534 | Walter | Jan. 4, 1921 |
| 1,393,009 | Carroll | Oct. 11, 1931 |
| 2,409,817 | Webber | Oct. 22, 1946 |
| 2,558,212 | Evans | June 26, 1951 |
| 2,709,854 | Price | June 7, 1955 |